United States Patent
Zhang et al.

(10) Patent No.: US 9,266,456 B2
(45) Date of Patent: Feb. 23, 2016

(54) CUP HOLDER AND VEHICLE DOOR CONTAINING THE SAME

(71) Applicant: Ford Global Technologies, LLC, Dearborn, MI (US)

(72) Inventors: Kadin Zhang, Jiangsu (CN); Lisa Lv, Jiangsu (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 30 days.

(21) Appl. No.: 14/193,435

(22) Filed: Feb. 28, 2014

(65) Prior Publication Data

US 2015/0115650 A1    Apr. 30, 2015

(30) Foreign Application Priority Data

Oct. 31, 2013  (CN) .......................... 2013 1 0533658

(51) Int. Cl.
    *B60N 3/10*    (2006.01)
(52) U.S. Cl.
    CPC ................ *B60N 3/102* (2013.01); *B60N 3/106* (2013.01)
(58) Field of Classification Search
    CPC ........... A47K 1/09; B60N 3/102; B60N 3/106
    See application file for complete search history.

(56) References Cited

U.S. PATENT DOCUMENTS

| | | | | |
|---|---|---|---|---|
| 1,319,844 | A | * | 10/1919 | Butler .............................. 211/65 |
| 3,391,891 | A | * | 7/1968 | Garden ....................... 248/311.2 |
| 4,511,072 | A | * | 4/1985 | Owens .......................... 224/549 |
| 4,828,211 | A | * | 5/1989 | McConnell et al. ........ 248/311.2 |
| 4,887,784 | A | * | 12/1989 | Kayali ........................ 248/311.2 |
| 5,104,184 | A | * | 4/1992 | Kwasnik et al. .......... 297/188.16 |
| 5,191,679 | A | * | 3/1993 | Harper ............................. 16/363 |
| 5,280,870 | A | * | 1/1994 | Chick et al. ................. 248/311.2 |
| 5,318,266 | A | * | 6/1994 | Liu .............................. 248/311.2 |
| 5,423,508 | A | * | 6/1995 | Isenga et al. ................ 248/311.2 |
| 5,860,630 | A | | 1/1999 | Wildey et al. |
| 5,897,089 | A | | 4/1999 | Lancaster et al. |
| 6,439,525 | B1 | * | 8/2002 | Gehring et al. ............. 248/311.2 |
| 6,640,551 | B1 | | 11/2003 | Slone et al. |
| 6,715,726 | B1 | * | 4/2004 | Dybalski ..................... 248/311.2 |
| 2004/0112930 | A1 | * | 6/2004 | Beglau ........................... 224/543 |
| 2005/0205739 | A1 | * | 9/2005 | DePue et al. ................ 248/311.2 |
| 2009/0250582 | A1 | * | 10/2009 | Ziaylek .................. A62B 25/00 248/312 |
| 2010/0096396 | A1 | * | 4/2010 | Doig et al. ..................... 220/737 |
| 2012/0181405 | A1 | * | 7/2012 | Zlatic .................. A47G 23/0225 248/313 |
| 2012/0280100 | A1 | * | 11/2012 | Stephan ...................... 248/311.2 |
| 2013/0075562 | A1 | | 3/2013 | Miklas |
| 2013/0092808 | A1 | * | 4/2013 | Adachi et al. ............... 248/311.2 |

FOREIGN PATENT DOCUMENTS

| | | | | |
|---|---|---|---|---|
| CA | 2282995 A1 | | 6/2000 | |
| EP | 0993985 A2 | * | 4/2000 | ............... B60N 3/10 |

* cited by examiner

*Primary Examiner* — Glenn Dayoan
*Assistant Examiner* — Paul Chenevert
(74) *Attorney, Agent, or Firm* — Gregory P. Brown; Law Firm of Dr. Junqi Hang, PLC

(57) ABSTRACT

According to one or more embodiments, a cup holder includes a support, an adjustable arm connected to the support, and a base connected to the support and spaced apart from the adjustable arm, the base being pivotal about the support in a first direction and being translatable to the adjustable arm in a second direction different from the first direction. The support may include a first member and a second member separable from the first member, the first member being connected to the adjustable arm and the second member being connected to the base.

12 Claims, 4 Drawing Sheets

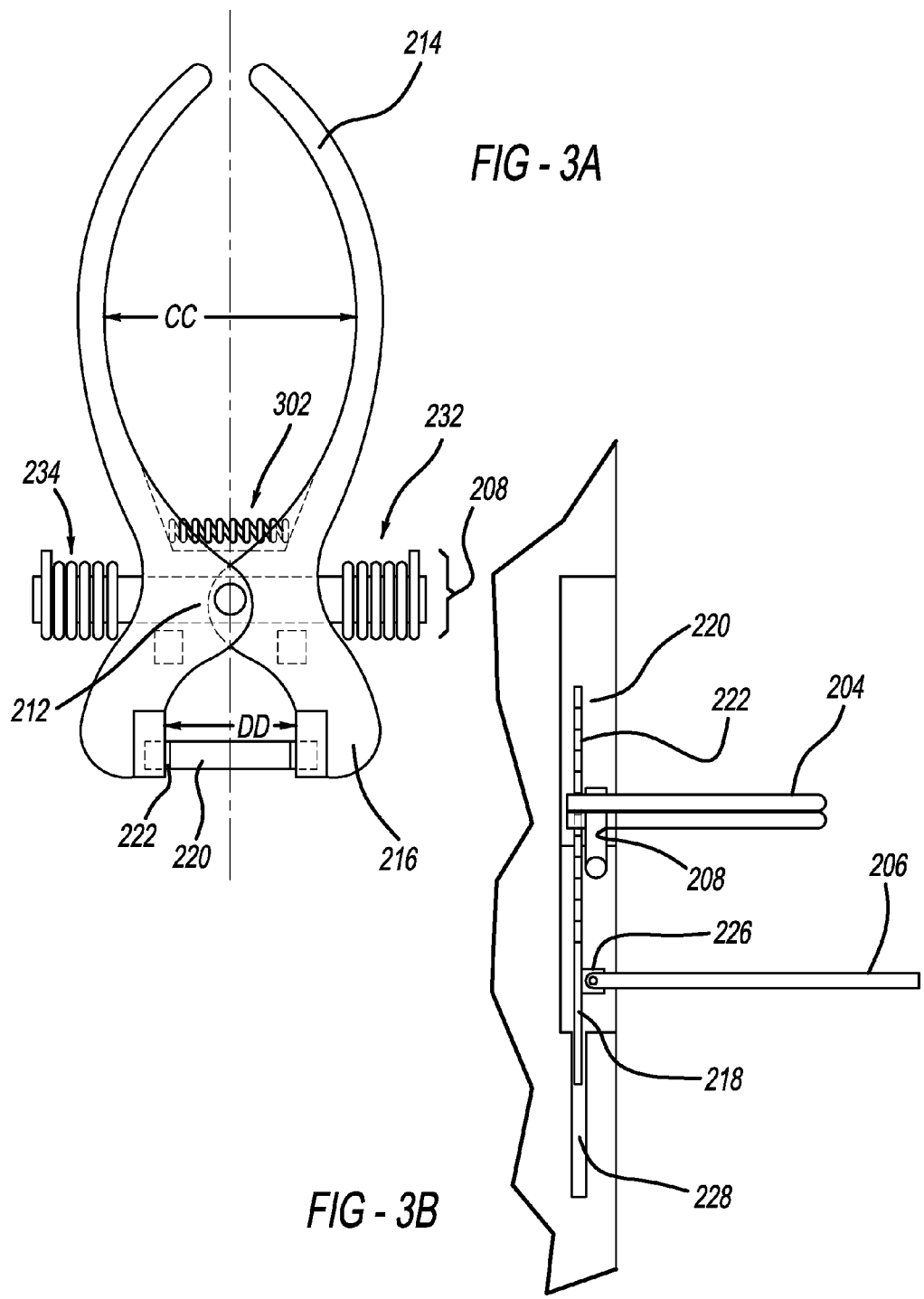

US 9,266,456 B2

CUP HOLDER AND VEHICLE DOOR CONTAINING THE SAME

RELATED APPLICATION(S)

This application claims the benefit of Chinese New Invention Patent Application No.: CN201310533658.4, filed Oct. 31, 2013, the entire contents thereof being incorporated herein by reference.

TECHNICAL FIELD

The disclosed inventive concept relates generally to a cup holder and a vehicle door containing the same, and particularly a cup holder retractable from a vehicle door.

BACKGROUND

In certain existing designs, vehicle cup holders are often placed in the space provided between the driver seat and the passenger seat. Not only do these designs unnecessarily take away the space which otherwise could be available for other uses, but also they usually come in with relatively little flexibility for size and/or height adjustment.

It would thus be advantageous if a cup holder may be produced without these identified problems, particularly problems in relation to space constraint to a vehicle interior.

SUMMARY

According to one or more embodiments, a cup holder includes a support, an adjustable arm connected to the support, and a base connected to the support and spaced apart from the adjustable arm, the base being pivotal about the support in a first direction and being translatable relative to the adjustable arm in a second direction different from the first direction.

The support may include a first member connected to the adjustable arm, and a second member connected to the base. The first member may be separable from the second member.

The support may further include a third member for engagement with the second member to facilitate the base's translation relative to the adjustable arm.

The second member may include a first portion and a second portion, the base being connected to the first portion and the adjustable arm being detachably connected to the second portion. The second portion of the second member may include at least one pair of protrusions for detachably connecting to the adjustable arm. The first portion of the second member may be translatable relative to the third member. The third member may include a cavity to at least partially receive the first portion of the second member for translation.

The adjustable arm may include a first arm portion, a second arm portion and a pivot portion positioned between the first and second arm portions, the adjustable arm pivoting about the support via the pivot portion. The pivot portion may further include a spring such that the first arm portion expands to increase its holding size while the second arm portion shrinks to decrease its holding size via the spring.

The support may be part of a vehicle door.

When in a closed position, the adjustable arm and the base may be received within the vehicle door, and when in an open position, the adjustable arm and the base are extending outside of the vehicle door.

According to another one or more embodiments, a cup holder includes a support including first and second members; an adjustable arm including first and second arm portions and a pivot portion positioned there between, the pivot portion pivoting about the first member; and a base connected to the second member, wherein the second arm portion detachably connects to the second member to balance the first arm portion when holding a cup.

The above advantages and other advantages and features will be readily apparent from the following detailed description of embodiments when taken in connection with the accompanying drawings.

BRIEF DESCRIPTION OF THE DRAWINGS

For a more complete understanding of embodiments of this invention, reference should now be made to the embodiments illustrated in greater detail in the accompanying drawings and described below by way of examples wherein:

FIG. 3A illustratively depicts another enlarged partial view of the cup holder referenced in FIG. 1A;

FIG. 3B illustratively depicts a partial cross-sectional view of the cup holder referenced in FIG. 1A;

DETAILED DESCRIPTION OF ONE OR MORE EMBODIMENTS

Figure 1A:
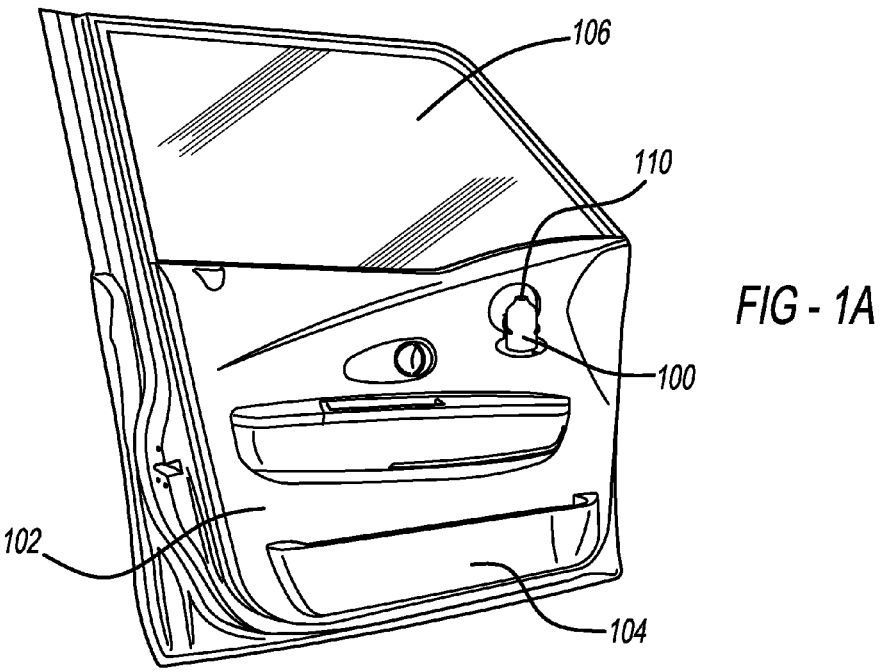
FIG. 1A illustratively depicts a vehicle door with a cup holder in an open position according to one or more embodiments.

As referenced in the FIG.s, the same reference numerals are used to refer to the same components. In the following description, various operating parameters and components are described for different constructed embodiments. These specific parameters and components are included as examples and are not meant to be limiting.

As will be detailed herein elsewhere, the present invention in one or more embodiments is advantageous at least by providing a cup holder that can be employed in and retractable from any suitable interior compartment of a vehicle. In certain instances, the interior compartment may be a driver or passenger door. In this connection, a user may have a relatively easy access to her/his favorite cup of coffee fastened by the cup holder sitting on the vehicle door right next to her/him while enjoying all the spaces vacated between the driver side and the passenger side, which otherwise would have unnecessarily been taken up by a conventional cup holder or cup holders.

FIG. 1A depicts an exemplary view of a cup holder 100 in an open position as provided relative to a vehicle door 102. The cup holder 100 is shown in use as holding a cup 110. A map pocket 104 and a glass window 106 are optionally positioned on the vehicle door 102 for the mere purpose of showing the non-limiting position of the cup holder 100 relative to the vehicle door 102.

Figure 1B:
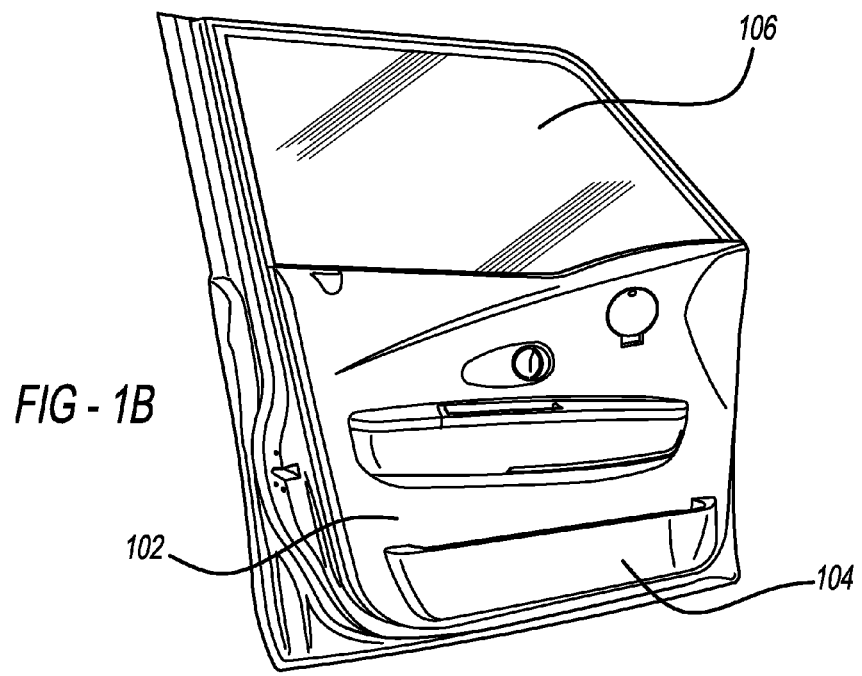
FIG. 1B illustratively depicts an alternative view of the cup holder referenced in FIG. 1A while in a closed position.

FIG. 1B illustratively depicts an alternative view of the cup holder 100 in a fully retracted or closed position. In this position, the cup holder 100 is not in use. As can be seen in FIG. 1B, the cup holder 100, when not in use, may be fully received within an interior of the vehicle door 102 such that space may be restored at the user's preference.

Figure 2:
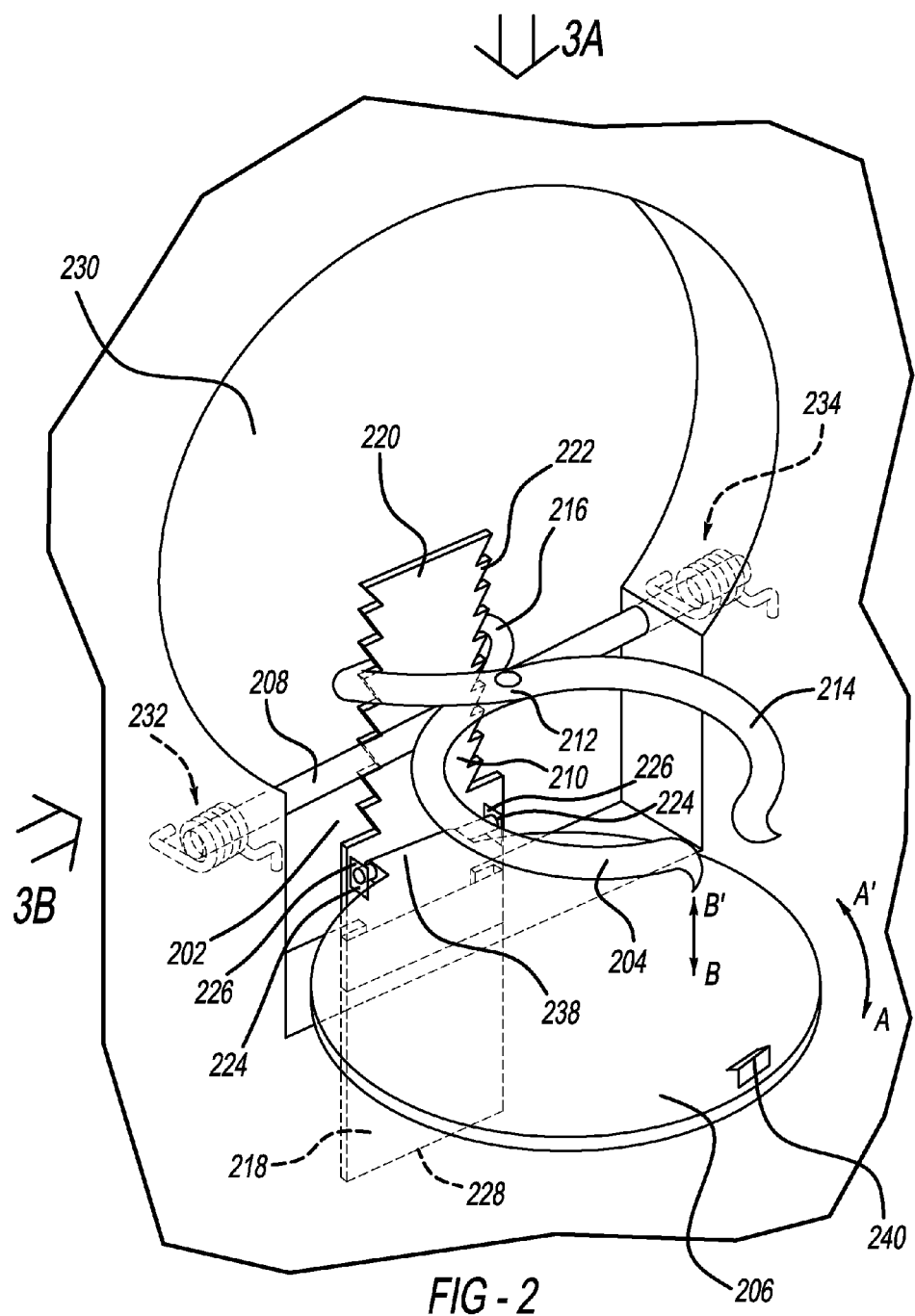
FIG. 2 illustratively depicts an enlarged partial view of the cup holder referenced in FIG. 1A.

FIG. 2 illustratively depicts an enlarged partial view of the cup holder 100 referenced in FIG. 1A according to one or more embodiments. As depicted in FIG. 2, the cup holder 100 includes a support generally shown at 202, connected to the vehicle door at one or more locations and may include one or more members as will be detailed herein elsewhere. The cup holder 100 further includes an adjustable arm 204 connected to the support 202, and a base 206 connected to the support 202 and spaced apart from the adjustable arm 204, the base 206 being pivotal about the support 202 in a first direction AA' and being translatable relative to the adjustable arm 204 in a second direction BB' different from the first direction AA'.

The support 202 is provided to have a general feature in supporting the adjustable arm 204 and the base 206. When the cup holder 100 is provided in relation to a vehicle door such as the vehicle door 102 depicted in FIG. 1A and FIG. 1B, the support 202 is connected to the vehicle door 102 at one or more locations of the vehicle door 102, and in certain instances the support 202 may be received within the vehicle door 102. However, it is within the general spirit of the present invention that the cup holder 100 may be positioned relative to any suitable locations in a vehicle and the support 202 may be positioned in relation to any suitable locations in the vehicle to provide the support for the adjustable arm 204 and the base 206. For the mere purpose of illustrating particular embodiments of the present invention, the cup holder 100 is detailed in relation to the vehicle door 102.

Referring back to FIG. 2, the support 202 may include a first member 208 and a second member 210 separable from the first member 208, the first member 208 being connected to the adjustable arm 204 and the second member 210 being connected to the base 206.

The base 206 may take any suitable shape and be formed of any suitable material. In certain non-limiting examples, the base 206 may be of the shape of a round, an oval, or an elongated oval, and may be made of any suitable plastic or polymer materials. The second member 210 may include a pair of seats 224 each with an open slot 226 to receive an extension 238 of the base 206 for movement along the direction of AA'.

As depicted in FIG. 2, the first member 208 may be an elongated rod having both ends connected to the vehicle door 102 such that the adjustable arm 204 pivots at a pivot portion 212 about the first member 208 while maintaining a fixed position at the pivot portion 212 relative to the first member 208 of the support 202. Although the first member 208 is depicted in FIG. 2 as an elongated rod, it does not have to be a rod or elongated rod, and may be of any suitable shapes and/or sizes. For instance, the first member 208 can be a panel instead of a rod and can have a cross-sectional shape other than a round.

As illustratively depicted in FIG. 2, the first member 208 may be positioned separate and spaced apart from the second member 210.

The second member 210 may include a first portion 218 and second portion 220, the base 206 being connected to the first portion 218 via the seats 224, and the adjustable arm 204 being detachably connected to the second portion 220. The second portion 220 of the second member 210 may include at least one pair of protrusions 222 for detachably docking the adjustable arm 204. The protrusions 222 may take any suitable shape or form as long as they can function to dock the adjustable arm 204.

The adjustable arm 204 may include a first arm portion 214 and a second arm portion 216, with the pivot portion 212 positioned between the first and second arm portions 214, 216. The adjustable arm 204 pivots about the support 202, and in particular the adjustable arm 204 pivots about the first member 208 via the pivot portion 212.

With further reference to FIG. 3A, which is a plan view taken along the direction 3A referenced in FIG. 2, the pivot portion 212 may include a spring 302 to ensure that an opening dimension CC of the first arm portion 214 maybe at its minimum while an opening dimension DD of the second arm portion 216 maybe at its maximum. Without wanting to be limited to any particular theory, it is believed that the elastic force of the spring 302 helps ensure that the first arm portion 214 tuck and provide force to clamp the cup 110 tightly. When in use, the first arm portion 214 may be expanded by increasing the opening dimension CC to receive and accommodate an incoming cup such as the cup 110 shown in FIG. 1A; accordingly, and at least partially via the action of the spring 302, the second arm portion 216 decreases its opening dimension DD. As a result, the second arm portion 216 gets rested on the pair of protrusions 222.

Referring back to FIG. 2, and in view of FIG. 3A, the first member 208 may be provided with reset springs 232, 234 to urge the adjustable arm 204 to an open position along the direction AA' so as to receive the incoming cup 110.

The support may further include a third member 228 in the form of a cavity or recess. Therefore the cavity may at least partially receive the first portion 218 of the second member 210 for translation.

FIG. 3B depicts a partial cross-sectional view of the cup holder 100 taken along the direction 3B referenced in FIG. 2. As depicted in FIG. 3B, the second member 210 translates along the third member 228, and as a result of that translation, the base 206 moves along in relation to the adjustable arm 204. The third member 228 may be configured as a recess or cavity integral to the vehicle door 102, and the translation along the direction BB' may be effected by the movement of the first portion 218 of the second member 210 relative to the third member 228.

When not in use, both the adjustable arm 204 and the base 206 may be positioned in the direction of A-A' to be received within the recess 230. The retraction may be reinforced by a latch-lock arrangement between the base 206 and the support 202. The latch-lock arrangement can take any suitable configuration. For instance, the latch-lock arrangement may include a lock 240 positioned on the base 206 and a latch (not shown) positioned on the support 202 to engage the locking arrangement. Therefore, when in a closed position, the adjustable arm 204 and the base 206 may be received within the vehicle door 102, and when in an open position, the adjustable arm 204 and the base 206 are extending outside of the vehicle door.

In certain instances, the extension 238 of the base 206 may be provided with a spring and a damper such that the base 206 may pivot about the support 202 relatively more slowly and steadily.

Figure 4C:
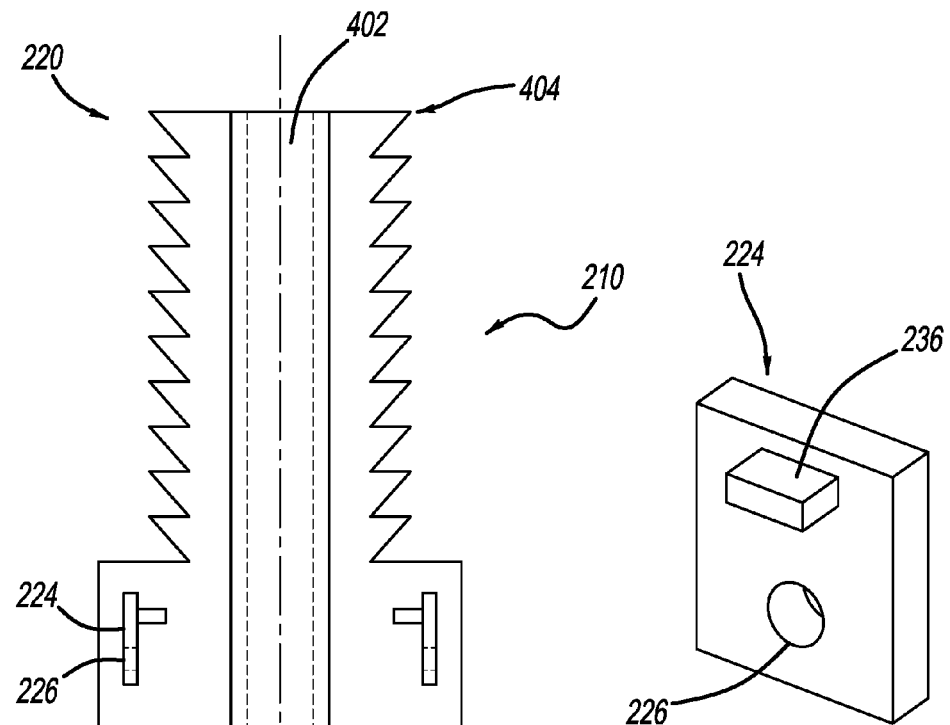
FIG. 4C illustratively depicts a partial top down view of the cup holder referenced in FIG. 4A.
Figure 4A:
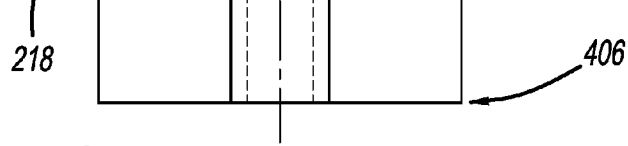
FIG. 4A illustratively depicts a partial exploded view of the cup holder referenced in FIG. 2.
Figure 4B:
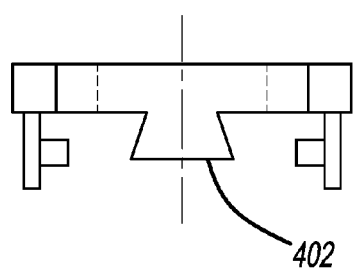
FIG. 4B illustratively depicts an alternative cross-section view of the cup holder referenced in FIG. 4A.

Referring back to FIG. 2 and further in view of FIGS. 4A-4B, each of the seats 224 may further include a restriction block 236 to provide certain restrictions to the pivoting motion of the base 206.

As illustratively depicted in FIGS. 4A-4B, the second member 210 may include a rail 402 having a cross-section of a generally protruding configuration so as to be received within the third member 228 for engagement and translation along the direction of BB'. Although the rail 402 is depicted in FIGS. 4A-4B to be of full length relative to the second member 210, it does not have to be in full length. The length of the rail 402 may vary and be of any suitable longitudinal length as needed. The rail 402 may generally be positioned more towards the first portion 218 than the second portion 220. The rail 402 may start at a location spaced apart from a top line 404 of the second portion 220 and/or a bottom line 406 of the first portion 218.

Moreover, the cross-section of the rail 402 may be of any suitable shape as long as the shape helps ensure the engagement and translation of the rail 402 relative to the third member 228.

In one or more embodiments, the disclosed invention as set forth herein overcomes the challenges faced by known production of polycarbonate articles such as polycarbonate articles with decorative or capacitive touch parts. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A cup holder comprising:
   a support;
   an adjustable arm connected to the support; and
   a base connected to the support and spaced apart from the adjustable arm, the base being pivotal about the support in a first direction and being translatable to the adjustable arm in a second direction different from the first direction;
   wherein the adjustable arm includes a first arm portion, a second arm portion and a pivot portion positioned between the first and second arm portions, the adjustable arm pivoting about the support via the pivot portion.

2. The cup holder of claim 1, wherein the pivot portion further includes a spring such that the first arm portion expands to increase its holding size while the second arm portion shrinks to decrease its holding size via the spring.

3. A cup holder comprising:
   a support including a first member, a second member and a third member separate from at least one of the first and second members;
   an adjustable arm connected to the first member; and
   a base connected to the second member and spaced apart from the adjustable arm, the base being pivotal about the support in a first direction and being translatable to the adjustable arm in a second direction different from the first direction,
   and wherein the second member includes a first portion and a second portion, the base being connected to the first portion and the adjustable arm being detachably connected to the second portion.

4. The cup holder of claim 3, wherein the second portion of the second member includes at least one pair of protrusions for detachably connecting to the adjustable arm.

5. The cup holder of claim 3, wherein the first portion of the second member is translatable to the third member.

6. The cup holder of claim 5, wherein the third member includes a cavity to at least partially receive the first portion of the second member for translation.

7. A cup holder comprising:
   a support including first and second members;
   an adjustable arm including first and second arm portions and a pivot portion positioned there between, the pivot portion pivoting about the first member; and
   a base connected to the second member, wherein the second arm portion detachably connects to the second member to balance the first arm portion when holding a cup.

8. The cup holder of claim 7, wherein the base pivots about the second member in a first direction and is translatable to the adjustable arm in a second direction different from the first direction.

9. The cup holder of claim 7, the support further includes a third member, the third member including a cavity to at least partially receive the second member for translation.

10. The cup holder of claim 7, wherein the first member is separate from the second member.

11. The cup holder of claim 7, wherein the second member includes a first portion and a second portion, the base being connected to the first portion of the second member and the second arm portion being detachably connected to the second portion of the second member.

12. The cup holder of claim 11, wherein the second portion of the second member includes at least one pair of protrusions for detachably connecting to the second arm portion.

\* \* \* \* \*